United States Patent
Colin et al.

[15] 3,671,398
[45] June 20, 1972

[54] PROCESS FOR PRODUCING POLYSACCHARIDES BY FERMENTATION

[72] Inventors: Pierre Colin; Roger Merle, both of Melle(Deux-Sevres), France

[73] Assignee: Melle-Bezons, Melle(Deux-Sevres), France

[22] Filed: Sept. 14, 1970

[21] Appl. No.: 72,157

Related U.S. Application Data

[63] Continuation-in-part of Ser. No. 717,439, March 24, 1968, abandoned.

[30] Foreign Application Priority Data

April 3, 1967 France....................................101218

[52] U.S. Cl................................................195/31 P, 195/29
[51] Int. Cl. .........................................................C12b 1/00
[58] Field of Search .....................195/31 P, 31, 29; 99/9, 59

[56] References Cited

UNITED STATES PATENTS

3,427,226  2/1969  McNeely..............................195/31 P

*Primary Examiner*—A. Louis Monacell
*Assistant Examiner*—Gary M. Nath
*Attorney*—McDougall, Hersh & Scott

[57] ABSTRACT

A process for producing polysaccharides by fermentation of carbohydrates in a fermentation bath with microorganisms of the class Xanthomonas in which the broth is formulated to contain a source of nitrogen selected from the group consisting of lactoserum or lactoserum and cereal bran in amounts corresponding to 5 to 15 grams of lactoserum on a dry solids basis per liter of broth when used alone, or 3 to 7 grams of lactoserum and 4 to 8 grams per liter of cereal bran when both are present in the broth as a source of nitrogen.

7 Claims, No Drawings

PROCESS FOR PRODUCING POLYSACCHARIDES BY FERMENTATION

This is a continuation-in-part of our copending application Ser. No. 717,439, filed March 24, 1968, and entitled "Process for Producing Polysaccharides by Fermentation" now abandoned.

This invention relates to the production of polysaccharides by fermentation.

It is known that polysaccharides can be produced by fermentation of glucides by means of polysaccharide-producing microorganisms, particularly bacteria of the class Xanthomonas, such as Xanthomonas campestris. In such fermentation processes, the nitrogen nutrient most often used is the so-called "distiller's dried solubles". Distiller's dried solubles are essentially composed of dried residues from corn (India corn) distillation and besides soluble nitrogen nutrients usable in the polysaccharide-producing fermentation contain yeasts and cellulosic substances. The water insoluble portion can exceed 50 percent by weight of the solid residues which, inongly colored.

An object of this invention is to provide a new and improved nutrient for polysaccharide fermentation containing nitrogen nutrient sources.

In accordance with the practice of this invention, the nutrient medium for the polysaccharide fermentation is contained in a fermentation broth containing saccharose or other glucide or carbohydrate such as glucose or other sugars, levulose and starch and in which the broth is formulated to contain a source of nitrogen nutrient in the form of milk serum (lactoserum) or a mixture of lactoserum and cereal bran.

Lactoserum is obtained during the manufacture of either casein or cheese from milk. It is constituted by the residual liquid remaining after complete or substantially complete coagulation of the casein. In the process of the present invention, the lactoserum may be utilized either in the liquid state or in solid form, particularly in the form of a powder after vaporizing off the water, as by spray drying.

A primary advantage of the process of the invention is to supply the polysaccharide-producing microorganisms with nitrogen nutrients which do not decrease the speed of fermentation, but may in fact increase the speed of fermentation and increase the yield of polysaccharide by comparison with the conventional use of distiller's dried solubles, and which permits the obtaining of fermented broths having a lower content of impurities which otherwise are difficult and expensive to remove, such as the yeasts as well as the colored impurities which are readily adsorbed by the polysaccharides at the time when the latter are coagulated and precipitated.

When operating in accordance with the process of the invention, there are produced polysaccharides which are substantially free of color and which have a very low content (ordinarily 0.2 to 0.45 percent by weight) of water insoluble substances. When distiller's dried solubles are used, such substantially color-free polysaccharides free of insoluble substances can be obtained only after high dilution of the fermented mout (hereinafter referred to as broth or must), and centrifugation thereof to separate out the water insoluble impurities. Dilution prior to centrifugation is necessary to lower the viscosity of the fermented broth to 400–700 centipoises (cps). The dilution subsequently requires increased consumption of reactants utilized to cause precipitation of the polysaccharides. Such undesirable dilution of the broth is not only avoided by the process of this invention but also the need to centrifuge is eliminated thereby to avoid the need for expensive and delicate centrifuge equipment. Without previous dilution, the centrifugation may be replaced by a simple filtration process which is easier and more economical.

When lactoserum alone is utilized, either in liquid or in solid form, it is employed in an amount within the range of 5 to 15 grams, and preferably about 100 grams, calculated on a dry solids basis, per liter of broth to be fermented. When lactoserum, either in liquid or solid form, and cereal bran are utilized together, the materials are employed in amounts within the range of 3 to 7 grams and preferably about 5 grams of lactoserum, calculated on a dry solids basis, and 4 to 8, and preferably about 6, grams of cereal bran per liter of broth.

The following non-limiting examples are given to illustrate various ways of realizing the process of the invention and comparison thereof with conventional techniques.

EXAMPLE 1

Into a water jacketed fermentation vat provided with aeration and stirring means, there is introduced 900 liters of water, 20 kg of aaccharose, 10 kg of lactoserum powder, 5 kg of dipotassium hydrogen phosphate and 0.25 kg of magnesium sulfate. The mixture is brought to boiling by injection of live steam and is maintained at boiling temperature for 1 hour. It is then cooled to 30° C. by passing cold water through the jacket surrounding the vat.

The broth is seeded with 250 ml of a leaven or inoculum in the form of Xanthomonas campestris culture which was obtained by seeding with Xanthomonas campestris 250 ml of a culture medium having the same composition as the broth to be fermented, then subjecting the seeded medium to incubation at 30° C. for 48 hours while shaking up and down.

After 78 hours fermentation, the viscosity of the broth rises to about 6,200 cps and, after 86 hours, to 6,500 cps. The sugar content of the broth remains constant at about 4.6 grams per liter, indicating that the fermentation is at an end.

The contents of the fermentation vat are then transferred to a precipitation vessel. There is added to the fermentation mixture 2 kg of potassium chloride and a mixture of 900 liters of secondary butanol and 300 liters of acetone to cause precipitation of the polysaccharides. The mixture obtained is stirred. After standing for 15 minutes, about 200 liters of a precipitate will be deposited in the vessel. 2,000 liters of supernatant liquid is withdrawn and the precipitate is dehydrated by washing it twice, each time with 200 liters of acetone which is recovered by withdrawal after decantation of the precipitate.

After being drained, the precipitate, while still wet with liquid, weighs 60 kg. It is collected on a filter, dried as in a drying room at 70° C. There is finally obtained 14.7 kg of white, dry polysaccharide having a content of water insoluble substances of 0.35 percent by weight. It forms a 1 percent by weight colloidal dispersion, or sol, in water having a viscosity of 2,120 cps.

EXAMPLE 2

Comparative fermentation experiments were carried out using, on the one hand, conventional amounts of distiller's dried solubles, and, on the other hand, various amounts of fresh, liquid lactoserum, calculated as dry substance. Use was made of fermentation vats of 10 liters capacity containing 5 liters of broth formulated per liter of 20 grams of saccharose, 5 grams of dipotassium hydrogen phosphate and 0.25 gram of magnesium sulfate, with the selected amount of organic nitrogen nutrient.

The leavens or inoculum for seeding the vats were prepared as described in Example 1. Each vat was seeded with 25 ml of leaven. The temperature was maintained at 30° C. for the duration of each fermentation operation.

The distiller's dried solubles used contained 25 percent to 28 percent by weight of proteins, i.e., about 4 percent by weight of nitrogen. The lactoserum, calculated on a dry basis, contained 70 percent by weight lactose and 13 percent by weight proteins, corresponding to about 2 percent of nitrogen. The fermentations were regarded as being at an end when the content of residual sugar was below 1.5 grams per liter, where distiller's dried solubles were used, or when the viscosity of the broth remained substantially constant, where lactoserum was used. This is because, contrary to what is indicated by certain authors, lactose is not entirely fermentable in a fermentation of this kind and, at the end of the operation, there is found, in unconverted form, about half of the starting lactose introduced with the lactoserum.

The following table I gives the results of these experiments. The yields are calculated in grams of polysaccharides obtained from 100 grams of saccharose brought into play. The lactose was not taken into account in calculating the yields.

TABLE I

| Nitrogen nutrient (g. per l.) | Fermentation time (hours) | Yield (percent) |
|---|---|---|
| Distiller's dried solubles — 7: | 90 | 71 |
| Lactoserum: | | |
| 7 | 96 | 73 |
| 10 | 80 | 75 |
| 12 | 70 | 76 |
| 15 | 64 | 74 |

The use of lactoserum resulted in all cases in an increase of yield and an increase in fermentation speed when the lactoserum is employed in amounts within the range of 10 to 15 grams per liter.

After precipitation and recovery of the polysaccharides by a method identical with that of Example 1, there was finally obtained:

a. from the broth containing distiller's dried solubles, a light brown, dry polysaccharide in which the content of water insoluble substances was 2.4 percent by weight and of which an aqueous sol at 1 percent by weight concentration had a viscosity of 1,820 cps; it had been necessary to filter the raw fermented broth;

b. from the broths containing lactoserum, substantially white polysaccharides were obtained in which the average content of water insoluble substances was 0.35 percent by weight and of which the aqueous sols at 1 percent by weight concentration had an average viscosity of 2,040 cps; there was no need of filtering the raw fermented broths.

EXAMPLE 3

There was carried out comparative experiments identical with those of Example 2 except that instead of lactoserum, use was made of various mixtures of lactoserum powder and wheat bran. The fermentations were regarded as being at an end when the viscosity of the broths remained substantially constant and it was necessary to filter the raw fermented broth prior to precipitation of polysaccharides therefrom.

The following Table II gives the results of these experiments. The yields are calculated as in Table I. In calculating the yields, the lactose from the lactoserum and the starch from the bran were not taken into account.

TABLE II

| Wheat bran (g. per l.) | Lactoserum (g. per l.) 3 | | 5 | | 7 | |
|---|---|---|---|---|---|---|
| | time (hour) | Yield (percent) | Time (hour) | Yield (percent) | Time (hour) | Yield (percent) |
| 4 | 136 | 72 | 88 | 74 | 86 | 75 |
| 8 | 86 | 76 | 86 | 77 | 62 | 78 |

There was finally obtained substantially white polysaccharides in which the content of water insoluble substances was 0.3 to 0.45 percent by weight and of which the aqueous sols at 1 percent by weight concentration had viscosities of 1,940 to 2,200 cps.

EXAMPLE 4

The carbohydrate source used is a starch hydrolysis product having the following composition:

| Directly reducing sugars (mainly glucose) | 70% by weight |
|---|---|
| Total reducing sugars | 88% by weight |
| Water (Fisher test) | 16% by weight |
| P (reckoned as $P_2O_5$) | 450 ppm |
| $SO_2$ | 100 ppm |
| Ashes | 1.1% by weight |

The operation of Example 1 is repeated with a broth of the following composition:

| Water | 900 liters |
|---|---|
| Starch hydrolysis product | 30 kg |
| Lactoserum powder | 10 kg |
| Dipotassium hydrogen phosphate | 5 kg |
| Magnesium sulfate | 0.25 kg |

The final fermentation is completed after 86 hours to yield a broth having a viscosity of 5,700 cps.

There is finally obtained 14.1 kg of a white, dry polysaccharide having a content of water insoluble substances of 0.40 percent by weight. It forms a 1 percent by weight sol in water having a viscosity of 1,940 cps.

EXAMPLE 5

The operation of Example 1 is repeated except that in the broth to be fermented, 20 kg of levulose is substituted for the saccharose as a source of carbohydrate. The fermentation is completed after 80 hours to yield a broth having a viscosity of 6,200 cps.

There is finally obtained 14.3 kg of a dry, white polysaccharide having a content of water insoluble substances of 0.36 percent by weight. It forms a 1 percent by weight sol in water having a viscosity of 2,040 cps.

EXAMPLE 6

The operation of Example 1 is repeated except that in the broth to be fermented, 15 kg of starch was bustituted to the saccharose as a source of carbohydrate. The fermentation is completed after 102 hours to yield a broth having a viscosity of 2,800 cps. There is finally obtained 9.5 kg of dry polysaccharide which has a very low color value. Its content of water insoluble substances is 0.52 percent by weight and its sol in water, at 1 percent by weight concentration, has a viscosity of 1,720 cps.

It will be understood that changes may be made in the details of formulation and operation without departing from the spirit of the invention, especially as defined in the following claims.

We claim:

1. A process for producing polysaccharides comprising subjecting a broth to fermentation with microorganisms of the genus Xanthomonas, in which the broth contains a carbohydrate and a source of soluble nitrogen selected from the group consisting of lactoserum and a mixture of cereal bran and lactoserum.

2. The process as claimed in claim 1 in which the lactoserum is employed in a liquid state.

3. The process as claimed in claim 1 in which the lactoserum is employed in powder form after vaporization off of liquid.

4. The process as claimed in claim 1 in which the lactoserum, when employed alone as the nitrogen source, is present in an amount within the range of 5 to 15 grams of dry solids per liter of broth.

5. The process as claimed in claim 1 in which the lactoserum, when employed alone as the nitrogen source, is present in an amount of about 10 grams of dry solids per liter of broth.

6. The process as claimed in claim 1 in which both lactoserum and cereal bran are present in the broth in an amount within the range of 3 to 7 grams lactoserum on a dry solids basis and 4 to 8 grams cereal bran per liter of broth.

7. The process as claimed in claim 1 in which both lactoserum and cereal bran are present in the broth in an amount of about 5 grams lactoserum on a dry solids basis and about 6 grams cereal bran per liter of broth.

* * * * *

UNITED STATES PATENT OFFICE
CERTIFICATE OF CORRECTION

Patent No. 3,671,398                      Dated June 20, 1972

Inventor(s) Pierre Colin et al.

It is certified that error appears in the above-identified patent and that said Letters Patent are hereby corrected as shown below:

Column 1, line 19, after "which," insert --- in addition, are generally strongly ---;

line 20, cancel "inongly".

Signed and sealed this 10th day of October 1972.

(SEAL)
Attest:

EDWARD M. FLETCHER, JR.                ROBERT GOTTSCHALK
Attesting Officer                      Commissioner of Patents